O. RICHTER & H. VOGEL.
TWO-STROKE CYCLE INTERNAL COMBUSTION ENGINE.
APPLICATION FILED MAY 26, 1915.
1,188,832.    Patented June 27, 1916.
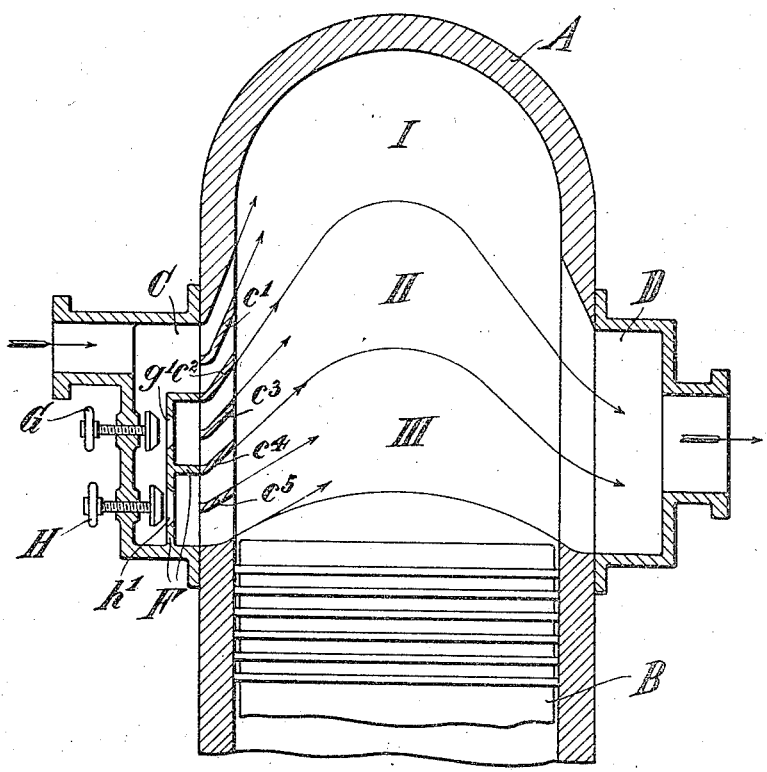
Inventors.
Oskar Richter and
Hans Vogel.
By Knight Bros
Attorneys.

UNITED STATES PATENT OFFICE.

OSKAR RICHTER AND HANS VOGEL, OF KIEL, GERMANY.

TWO-STROKE-CYCLE INTERNAL-COMBUSTION ENGINE.

1,188,832.

Specification of Letters Patent. Patented June 27, 1916.

Application filed May 26, 1915. Serial No. 30,618.

*To all whom it may concern:*

Be it known that we, OSKAR RICHTER and HANS VOGEL, citizens of the German Empire, residing at Kiel, Germany, have invented certain new and useful Improvements in Two-Stroke-Cycle Internal-Combustion Engines, of which the following is a specification.

The present invention relates to an improvement on the engine described and claimed in our application filed April 21, 1915, Serial No. 22,908.

In the accompanying drawing is illustrated one embodiment of the invention showing a vertical section of the parts concerned in a vertical working cylinder.

A is the working cylinder and B the piston of a two-stroke cycle internal combustion engine which is provided with scavenging and exhaust ports, regulated by the piston, and opening into passages C and D. For the sake of clearness only one scavenging port and one exhaust port has been shown and the length of the ports has been made larger than they should be in reality. In the scavenging ports are constructed, in the usual manner, guide blades $c^1$ $c^2$ $c^3$ $c^4$ $c^5$ which serve as conductors for the scavenging air entering from the passage C. The outlet angles of these guide blades and the adjacent walls of the scavenging ports, have been selected as in the case of the above referred to application, so that they increase in size from above downward, whereby the scavenging air will be uniformly distributed for scavenging in the whole chamber of the cylinder.

In accordance with the present invention the spaces between the blades $c^2$ and $c^4$, as well as between the blade $c^4$ and the lower limiting surface of the scavenging port are separated by walls F from the passage C and two check valves G and H have been provided for the purpose of regulating the admittance of the scavenging air to the spaces just mentioned.

By means of this arrangement is attained that the scavenging air in the scavenging zone I is given a greater speed than what is the case in the scavenging zone II, corresponding to the longer way which it has to travel, and that the scavenging air in the scavenging zone III has the least speed corresponding to its smallest way of travel. It might occur in the arrangement described in the above mentioned application that the greatest amount of scavenging air selects the shortest way (zone III) and passes the cylinder without the desired scavenging action, while it is of great importance that the upper portion of the cylinder be well scavenged.

In place of the check valves G, H, annular slide valves may be used, and lastly the checking members may also be entirely dispensed with and the correct speed of the scavenging air attained through different sizes of the entrances $g^1$ $h^1$.

We claim:—

1. In a two-stroke cycle internal combustion engine having scavenging orifices subdivided by guide blades, said blades being arranged to provide a gradual increasing of the outlet angles of the scavenging air in the direction toward the crank shaft of the engine; means for increasing the speed of the air entering into the cylinder oppositely to the increase of said outlet angles.

2. In a two-stroke cycle internal combustion engine having scavenging orifices subdivided by guide blades, said blades being arranged to provide a gradual increasing of the outlet angles of the scavenging air in the direction of the crank shaft of the engine; means for increasing the speed of the scavenging air entering into the cylinder in accordance with the longer distance said air has to travel in the cylinder.

3. In a two-stroke cycle internal combustion engine having scavenging orifices subdivided by guide blades, said blades being arranged to provide a gradual increasing of the outlet angles of the scavenging air in the direction of the crank shaft of the engine; means for increasing the speed of the scavenging air entering into the cylinder in accordance with the longer distance said air has to travel in the cylinder, said means comprising a wall connecting some of said blades said wall being provided with openings for admitting the air and members registering with said openings for regulating the air passing through the openings.

In testimony whereof the foregoing specification is signed in the presence of two witnesses.

OSKAR RICHTER.
HANS VOGEL.

Witnesses:
   JULIUS ROJCKE,
   HEINRICH HANSCHILDT.